United States Patent Office 3,497,331
Patented Feb. 24, 1970

3,497,331
ZINC AND CADMIUM DICHALCOGENIDES OF PYRITE-TYPE CRYSTAL STRUCTURE AND THEIR PREPARATION
Tom A. Bither, Jr., Wilmington, Del., assignor to E. I. du Pont de Nemours and Company, Wilmington, Del., a corporation of Delaware
No Drawing. Filed Oct. 17, 1966, Ser. No. 586,928
The portion of the term of the patent subsequent to Dec. 9, 1986, has been disclaimed
Int. Cl. C01b 19/00; C01g 9/08; H01l 3/02
U.S. Cl. 23—315                               8 Claims

ABSTRACT OF THE DISCLOSURE

Zinc and/or cadmium sulfides and/or selenides of the pyrite-type crystal structure having the general formula $$Zn_{1-x}Cd_xS_ySe_z$$

wherein $x$ is a number in the range 0 to 1, $y$ and $z$ each have a value of 0 to 2.1 and the sum of $y$ and $z$ is in the range 1.9 to 2.1 are disclosed; these materials are prepared by heating appropriate mixtures of the elements or of at least one binary chalcogenide with the other chalcogen at a pressure of 50–100 kb. and a temperature of 300–1200° C. These dichalcogenides find use in electronic circuit components.

---

This invention relates to metallic chalcogenides and their preparation.

DESCRIPTION OF THE INVENTION

This invention is directed to isotypic crystalline compositions having the cubic pyrite-type structure selected from zinc sulfides and selenides, cadmium sulfides and selenides, zinc-cadmium sulfides and selenides, zinc and cadmium sulfide-selenides and zinc-cadmium sulfide-selenide of the formula $$Zn_{1-x}Cd_xS_ySe_z$$

wherein $x$ is a number in the range of 0 to 1 and $y$ and $z$ are each a number in the range of 0 to 2.1 and the sum of $y$ and $z$ is a number in the range of 1.9 to 2.1. These compositions have the nominal formulae: $ZnSe_2$, $CdS_2$, $ZnS_2$, $CdSe_2$, $(Zn,Cd)S_2$, $Zn,Cd)Se_2$, $Zn(S,Se)_2$, $Cd(S,Se)_2$ and $(Zn,Cd)(S,Se)_2$. These compositions can be expressed as $ZnS_{2.0\pm0.1}$, $ZnSe_{2.0\pm0.1}$, $CdS_{2.0\pm0.1}$, $CdSe_{2.0\pm0.1}$, $Zn_{1-x}Cd_x$-$S_{2.0\pm0.1}$, $Zn_{1-x}Cd_xSe_{2.0\pm0.1}$, $Zn(S, Se)_{2.0\pm0.1}$, $Cd(S, Se)_{2.0\pm0.1}$, and $(Zn, Cd)(S, Se)_{2.0\pm0.1}$ These dichalcogenides are of the pyrite-type crystal structure which has the symmetry $Pa3$, contains four molecules of $AB_2$ per unit cell (for pyrite, $FeS_2$, the cell edge is about 5.41 A.), and is designated as structure type C-2 in the "Strukturbericht" of the Zeitschrift fur Kristallographie."

The pyrite-type chalcogenides of this invention correspond in composition approximately to dichalcogenides. However, as is known for other dichalcogenides, deviations from exact stoichiometry sometimes occur. However, the atomic ratio of total chalcogen to total metal in these chalcogenides is always in the range of 1.9:1 to 2.1:1. For simplicity, the products are referred to as dichalcogenides in what follows. Nonstoichiometric compounds are well recognized, see, e.g., Wadsley's chapter in Mandelcorn, "Non-Stoichiometric Compounds," Academic Press, New York (1964), pp. 98–209.

The products of this invention are obtained by heating at pressures of about 50 to 100 kilobars (kb.) and at temperatures of between 300–1200° C. either elemental zinc, elemental cadmium, elemental sulfur, or elemental selenium in the desired proportions or the appropriate zinc or cadmium chalcogenide, i.e., sulfide or selenide or mixtures thereof, with an amount of sulfur, selenium or a mixture thereof to give the necessary stoichiometry as expressed by the above generic formula.

The process comprises reacting under the conditions described above a reaction mixture selected from the group consisting of elemental zinc and sulfur; elemental cadmium and sulfur; elemental zinc and selenium; elemental cadmium and selenium; elemental zinc, cadmium and sulfur; elemental zinc, cadmium and selenium; elemental zinc, sulfur and selenium; elemental cadmium, sulfur and selenium; elemental zinc, cadmium, sulfur and selenium; zinc chalcogenide and sulfur; zinc chalcogenide and selenium; cadmium chalcogenide and sulfur; cadmium chalcogenide and selenium; and a mixture of a zinc chalcogenide and a cadmium chalcogenide with at least 1 chalcogen.

Excess chalcogen can be used to shift the equilibrium and produce a desired product. Traces of iodine can be incorporated into the reaction mixtures to improve reactivity. The preferred reaction pressure is between 60 and 90 kb. The reaction temperature also can be 400–1000° C. and preferably can be 400–800° C. Most preferred reaction temperature is around 600° C. The reaction time generally lies between 1–8 hours.

The reaction is carried out by mixing and pelleting (at 20–60 tons per square inch) the reactants (powders are preferred in order to achieve good mixing) and subjecting them to the above reaction conditions.

The reaction product can be either cooled slowly (25–200° C. per hour) or cooled quickly by quenching. The former cooling method usually favors production of crystals of a larger size than does the latter method. It is preferred to allow the sample to cool slowly to a temperature in the range of 400–600° C. before quenching. When the reaction mixture is quenched, the temperature of the reaction mixture is dropped from operating temperature to room temperature within a short period of time such as a few minutes or less.

The products of the invention can be obtained as a single phase or in discrete sections of the reaction mass along with sections comprising unreacted materials and other impurities. The novel dichalcogenides can be separated by hand or mechanical means. Unreacted sulfur can be removed from the product by extraction with carbon disulfide.

The high pressures necessary in these reactions can be obtained using a tetrahedral anvil pressure device as described by E. C. Lloyd et al., Journal of Res., Nat. Bureau of Standards, 63C, 59 (1959). In this device, the reactants are placed in a boron nitride container which fits in a graphite sleeve that serves as a resistance heater. This assembly is enclosed in a pyrophyllite tetrahedron and placed in the anvil device. Pressures in excess of 65 kb. are possible in a tetrahedral anvil device, which has been demonstrated to levels in excess of 90 kb.

Other devices for developing extreme pressure can also be used, such as a cascade machine providing two stages of pressure, with the lower pressure primary stage serving to support the smaller, higher-pressure vessel. Two-stage devices were employed by P. W. Bridgman [Phys. Rev., 57, 342 (1940) and Proc. Am. Acad. Arts Sci., 74, 425 (1942)], and more recently have been described by F. R. Boyd in "Modern Very High Pressure Techniques," Wentorf, editor, Butterworth and Co., Ltd., London, p. 154 (1962).

In one embodiment of a two-stage device, the pressure in the inner cylindrical vessel is developed by the opposed motion of two carbide pistons. The inner vessel itself is supported radially through a tapered press fit of controlled interference into the cylindrical vessel of the primary stage. Support of both ends of the inner stage is achieved through pressure development in plastic polytetrafluoroethylene employed in the primary stage. Force and motion of the two pistons of the primary stage serve to develop simultaneously the support pressure and the ultimate high pressure in the inner vessel.

The pressure medium of the inner stage is made of the soft plastic mineral pyrophyllite. Centrally located in the pyrophyllite is a cylindrical graphite sleeve which serves as a resistance heater around the boron nitride container. Electrical contacts with the graphite heater are made through the inner pistons which, in turn, are in contact with the pistons of the primary stage vessel. Suitable electrical insulation is provided for one pair of inner and primary pistons.

For a primary stage of fixed diameter, the pressure developed in the polytetrafluoroethylene and the pressure developed in the inner stage are related to the relative lengths and the relative compressibilities. As usually controlled, the relative motion of the primary pistons and the force applied to them is correlated with the electrical transitions accompanying recognized phase transitions. In the tetrahedral anvil device, direct correlation of force with electrical transition is possible.

Four of the calibration points used to determine pressure developed in these devices appear in the 1963 edition of the American Institute of Physics Handbook, part 4, p. 43, as follows. All values are for ambient temperature.

Bismuth I→II 25.37±0.02 kb.
Bismuth II→III 26.96±0.18 kb.
Thallium II→III 36.69±0.11 kb.
Barium II→III 59.0±1.0 kb.

The additional transformation point of Bi VI→VIII was considered to be 89±3 kb. ("High Pressure Measurement," Giardini-Lloyd, eds., Butterworth and Co., Ltd., London, p. 1 (1963) reporting work by Montgomery, Stromberg, G. H. Jura and G. Jura on calibration studies.)

All compressions in the following examples were made on the cold assembly, and the charges then heated to the desired temperatures. With the anvil device, the appropriate thermocouple was used. No pressure correction for thermocoupled behaviour has been introduced, standard E.M.F. tables for 1 atm. being employed. In the cascade device, the tempreature obtained was established from a calibration curve of power input vs. temperature determined by observing the melting of nickel and the $\alpha \rightleftarrows \gamma$ transition in iron in similar assemblies. The melting points of nickel are reported to 60 kb. by Strong, "Modern Very High Pressure Techniques," Butterworth and Co., Ltd., London, 1962, p. 115, and were extrapolated to 89 kb. The reference temperatures for the $\alpha \rightleftarrows \gamma$ transition of iron are reported by Claussen, "High Pressure Measurement," Butterworth and Co., Ltd., London, 1963, p. 133. The pressure unit is a bar, equivalent to $10^6$ dyne/scm.$^2$. The larger unit, a kilobar, equal to 1000 bars, is used herein.

EMBODIMENTS OF THE INVENTION

The following examples further illustrate the invention.

EXAMPLE 1

Zinc disulfide

A 0.082 g. pellet from a mixture of 0.439 g. of ZnS plus 0.144 g. of S was heated approximately one hour at 1200° C., and then quenched to room temperature, all at a pressure of 89 kb. The resultant product comprised an outer layer of off-white ZnS crystals surrounding a core of bright yellow, microcrystals. The yellow crystals were separated and treated with $CS_2$ to remove unreacted sulfur. An X-ray powder pattern was obtained on the purified crystals and is listed below, after deletion of weak lines corresponding to ZnS, one of the starting materials. This powder pattern indexes on the basis of a primitive cubic cell of edge length $a=5.954$ A. The relative intensities of the lines of this pattern approximately match the intensities of the lines of the powder pattern of pyrite, $FeS_2$. The powder pattern of the product also has the proper systematic absences for the Pa3, pyrite-type, space group. These data establish the isotypism of the product of this example and pyrite, $FeS_2$. This isotypism establishes that the product has the nominal formula $ZnS_2$.

| Intensity* | d Spacing | hkl | Intensity* | d Spacing | hkl |
|---|---|---|---|---|---|
| M2 | 3.450 | 111 | M3 | 1.215 | 422 |
| S | 2.986 | 200 | F | 1.188 | 430 |
| M2 | 2.665 | 210 | F | 1.166 | 431 |
| M2 | 2.434 | 211 | M2 | 1.147 | 511 |
| M1 | 2.106 | 220 | M4 | 1.106 | 520 |
| M4 | 1.992 | 221 | M4 | 1.087 | 521 |
| S | 1.796 | 311 | M3 | 1.052 | 440 |
| M3 | 1.720 | 222 | M3 | 1.006 | 531 |
| M3 | 1.651 | 320 | M3 | 0.993 | 600 |
| M3 | 1.591 | 321 | M3 | 0.966 | 611 |
| F | 1.443 | 410 | F | 0.940 | 620 |
| V | 1.403 | 411 | F | 0.930 | 621 |
| M3 | 1.365 | 331 | M4 | 0.908 | 533 |
| M3 | 1.333 | 420 | M3 | 0.826 | 640 |
| M4 | 1.298 | 421 | M3 | 0.796 | 642 |
| F | 1.268 | 332 | M3 | 0.775 | 731 |

*The letter S designates the strongest lines observed, M1, M2, M3, and M4 are lines of medium intensity, the order of intensity decreasing with increasing numerical sequence, and F and V mean faint and very faint lines.

EXAMPLE 2

Zinc disulfide

A 0.083 g. pellet from a mixture of 0.341 g. of ZnS plus 0.168 g. of S was heated 5 hours at 790° C., and then quenched to room temperature, all at a pressure of 89 kb. The resultant product, after extraction with $CS_2$ to remove excess sulfur, was obtained as bright yellow, microcrystals admixed with a small amount of off-white solid. The yellow crystals of zinc disulfide gave an X-ray powder pattern corresponding to the same cubic pyrite-type of crystal structure observed in the product of Example 1 ($a=5.954$ A.) plus extra lines indicating a small amount of ZnS.

A two-probe resistivity measurement carried out on this material in the form of a compact under a pressure of 40 tons/sq. in. showed the room temperature resistivity to be about $1 \times 10^6$ ohm-cm. The resistance increased with decreasing temperature, indicating it to be a semiconductor. Under the same conditions, a compact of the ZnS starting material had a resistivity of $2 \times 10^7$ ohm-cm. at room temperature. At atmospheric pressure, the compact of pyrite-type zinc disulfide showed a dark resistance and a resistance under infrared irradiation (0.75 to $4.5\mu$) of $1.3 \times 10^{11}$ ohms, whereas irradiation with U.V. plus visible light (about 3600–6020 A.) gave a lower resistance of $4.6 \times 10^{10}$ ohms. These results indicate this material to be a photoconductor.

Thermal stability studies carried out by an elevated temperature X-ray diffraction investigation indicated that the pyrite-type of zinc disulfide decomposed to ZnS+S in the temperature range 200–250° C.

EXAMPLE 3

Zinc disulfide

A 0.348 g. pellet from a mixture of 0.70 g. of ZnS plus 0.691 g. of S was heated 1 hour at 600° C., slow cooled 5 hours to 475° C., and then quenched to room temperature, all at a pressure of 65 kb. After extraction with $CS_2$, a powdery yellow product containing some white crystals resulted. X-ray diffraction powder data showed the same pyrite-type of pattern for zinc disulfide observed in Example 1, plus extra lines corresponding to some ZnS.

Two-probe resistivity measurements on this material in the manner of Example 2 showed it to be a semiconductor.

EXAMPLE 4

Zinc disulfide

A 0.326 g. pellet from a mixture of 0.439 g. of ZnS plus 0.144 g. of S was heated 6 hours at 400° C., and then quenched to room temperature, all at a pressure of 65 kb. After extraction with $CS_2$, a bright yellow, porous, microcrystalline matrix remained containing some small white crystals. X-ray diffraction powder data showed the same pyrite-type of pattern for zinc disulfide observed in Example 1 ($a=5.954$ A.) plus extra lines corresponding to some ZnS.

EXAMPLE 5

Zinc disulfide

A 0.415 g. pellet from a mixture of 0.500 g. of Zn (30 mesh U.S. Standard Seive Series) plus 0.613 g. of S was heated 1 hour at 1000° C., slow cooled 5 hours to 500° C., and then quenched to room temperature, all at a pressure of 65 kb. The resultant yellow product was polyphase and X-ray diffraction powder data showed the same pyrite-type of powder pattern for zinc disulfide observed in Example 1, as well as lines coresponding to Zn, ZnS, and S.

EXAMPLE 6

Zinc disulfide

In order to obtain an essentially amorphous reactive zinc sulfide as starting material, the aqueous reaction of $ZnSO_4 \cdot 7H_2O/Na_2S_2O_3 \cdot 5H_2O$ (½ mole ratio) was carried out according to the method of E. Grillot (Bull. Soc. Chim., France [1951], 39) to give a pale yellow powder, the X-ray diffraction pattern of which showed the sphalerite form of ZnS having extremely poor crystallinity plus some free sulfur. A 0.356 g. pellet from a mixture of 1.0 g. of the above product plus 0.5 g. of sulfur was heated 4 hours at 600° C., and then quenched to room temperature, all at a pressure of 65 kb. After extraction with $CS_2$, a bright yellow, porous matrix containing some white crystals was obtained that crushed very readily to a powder. X-ray diffraction powder data showed the same pyrite-type of pattern for zinc disulfide observed in Example 1 ($a=5.954$ A.) plus weak lines corresponding to small amounts of ZnS and a $CS_2$-insoluble, high-pressure form of sulfur.

EXAMPLE 7

Zinc disulfide

A 0.376 g. pellet from a mixture of 1.5 g. of amorphous zinc sulfide (Example 6), 0.2 g. of sulfur, and a trace of iodine was heated 4 hours at 600° C., followed by a quench to room temperature, all at a pressure of 65 kb. After extraction with $CS_2$, a yellow powder was obtained following gentle crushing. X-ray diffraction powder data showed the same pyrite-type of pattern observed in Example 1 ($a=5.954$ A.) plus one weak line indicating a minor amount of ZnS. The ratio of Zn to S by analysis gave the formula $ZnS_{1.92}$, in good agreement with the pyrite-type formula $ZnS_2$ in view of the presence of a small amount of ZnS impurity.

This preparation was repeated duplicating these reaction conditions, except that a heating time of 6 hours was employed. The resultant yellow powder, after extraction with carbon disulfide to remove sulfur, showed the same pyrite-type of X-ray powder pattern.

*Analysis.*—Calcd. for $ZnS_2$: Zn, 50,48. Found: Zn, 50.36.

EXAMPLE 8

Zinc diselenide

A 0.160 g. pellet from a mixture of 0.131 g. of Zn (30 mesh) plus 0.316 g. of Se was heated for 2 hours at 1000° C., and then quenched to room temperature, all at a pressure of 89 kb. The resultant product comprised a metallic-appearing phase as the dominant one interspersed with some yellow material (ZnSe). An X-ray diffraction powder pattern obtained on the product, after deletion of weak lines corresponding to ZnSe (sphalerite type) and Se, was indexed on the basis of a cubic pyrite-type structure with cell dimension $a=6.290$ A., showing the isotypism of the product and pyrite. This isotypism establishes that the product has the nominal formula $ZnSe_2$.

| Intensity* | d Spacing | hkl | Intensity* | d Spacing | hkl |
|---|---|---|---|---|---|
| 1 | 3.624 | 111 | 3 | 1.148 | 521 |
| 10 | 3.142 | 200 | 5 | 1.112 | 440 |
| 10 | 2.810 | 210 | 2 | 1.048 | 600 |
| 10 | 2.566 | 211 | 1 | 1.034 | 610 |
| 9 | 2.222 | 220 | 4 | 1.020 | 611 |
| 3 | 2.095 | 221 | 1 | 0.982 | 621 |
| 10 | 1.895 | 311 | 1 | 0.971 | 541 |
| 4 | 1.813 | 222 | 1 | 0.959 | 533 |
| 10 | 1.743 | 320 | 1 | 0.938 | 630 |
| 10 | 1.679 | 321 | 1 | 0.927 | 631 |
| 3 | 1.572 | 400 | 1 | 0.898 | 632 |
| 3 | 1.524 | 410 | 1 | 0.890 | 543 |
| 1 | 1.481 | 411 | 1 | 0.881 | 711 |
| 1 | 1.442 | 331 | 2 | 0.872 | 640 |
| 1 | 1.406 | 420 | 2 | 0.864 | 720 |
| 6 | 1.372 | 421 | 2 | 0.856 | 721 |
| 3 | 1.340 | 332 | 2 | 0.841 | 642 |
| 2 | 1.283 | 422 | 2 | 0.819 | 731 |
| 1 | 1.257 | 430 | 2 | 0.806 | 650 |
| 2 | 1.233 | 431 | 2 | 0.799 | 732 |
| 7 | 1.210 | 511 | 1 | 0.781 | 810 |
| 6 | 1.168 | 520 | 1 | 0 775 | 811 |

*An intensity value of 10 is assigned to the strongest lines of the pattern.

EXAMPLE 9

Zinc diselenide

A 0.620 g. pellet from a mixture of 0.327 g. of Zn (30 mesh) plus 0.790 g. of Se was heated to 1200° C. in 1 hour, held 1 hour at 1200° C., slow cooled to 400° C. in 4 hours, and then quenched to room temperature, all at a pressure of 65 kb. The resultant product comprised sections of amber colored ZnSe at the ends followed by thin metallic-appearing layers with the center section also appearing metallic, but having a pink cast thereto. X-ray diffraction powder data showed the metallic-appearing layers to have a cubic pyrite-type of pattern for zinc diselenide similar to that observed in Example 8, but of smaller cell dimension, $a=6.242$ A. The same pyrite-type phase plus Se was observed in the center of the sample.

EXAMPLE 10

Zinc diselenide

A 0.609 g. pellet from a mixture of 1.000 g. of Zn plus 3.019 g. of Se was heated for 1 hour at 600° C., slow cooled to 500° C. in 4 hours, and then quenched to room temperature, all at a pressure of 65 kb. Well-formed crystals, metallic in appearance, but having a pinkish cast thereto, were isolated from the ends of the reaction product. Traces of yellow ZnSe were also evident. X-ray diffraction powder data showed these crystals to have the same cubic pyrite-type of pattern for zinc diselenide observed in Example 8 with cell dimension $a=6.293$ A. Product from the center of the reaction mixture contained the same pyrite-type phase plus free selenium.

Four-probe resistivity measurements carried out on crystals of this pyrite-type zinc diselenide showed it to be a semiconductor ($\rho_{r.t.}$ $2\times 10^6$, $\rho_{170°\ K}$ $1.5 \times 10^9$ ohm-cm.) with an activation energy of resistivity of 0.24 ev. This material was also a photoconductor since the resistivity dropped to $2.7 \times 10^5$ ohm-cm. when irradiated with visible plus infrared radiation. Infrared alone ($0.75$–$4.5\mu$) caused a drop to $9.4 \times 10^5$ ohm-cm.

EXAMPLE 11

Zinc diselenide

A second 0.650 g. pellet of the Zn-Se mixture of Example 10 was heated for 1 hour at 800° C., slow cooled to 550° C. in 5 hours, and then quenched to room temperature, all at a pressure of 65 kb. The resultant product comprised a mixture of the same pyrite-type of zinc diselenide obtained in Example 10 plus a higher proportion of ZnSe and Se.

EXAMPLE 12

Cadmium disulfide

In order to obtain an essentially amorphous, reactive cadmium sulfide as starting material, the aqueous reaction of $CdSO_4/Na_2S_2O_3 \cdot 5H_2O$ (½ mole ratio) was carried out according to the method of E. Grillot (Bull. Soc. Chim., France [1951], 39) to give an orange powder, the X-ray diffraction pattern of which showed the wurtzite form of CdS having extremely poor crystallinity plus some free sulfur. A 0.402 g. pellet from a mixture of 1.0 g. of the above product plus 0.36 g. of S was heated 4 hours at 600° C., and quenched to room temperature, all at a pressure of 65 kb. The resultant product comprised yellow micro-crystals at the sample ends and red-orange crystals in the center. Following extraction extraction with $CS_2$, an X-ray diffraction powder pattern was obtained on the yellow crystals. This pattern (listed below), after deletion of weak lines corresponding to a $CS_2$ insoluble, high pressure form of sulfur, was indexed on the basis of a cubic pyrite-type structure with cell dimension $a=6.309$ A., showing the isotypism of the product and pyrite. This isotypism establishes that the product has the nominal formula $CdS_2$.

| Intensity* | d Spacing | hkl | Intensity* | d Spacing | hkl |
|---|---|---|---|---|---|
| 95 | 3.646 | 111 | 15 | 1.287 | 422 |
| 100 | 3.156 | 200 | 5 | 1.263 | 430 |
| 30 | 2.824 | 210 | 5 | 1.237 | 431 |
| 35 | 2.575 | 211 | 25 | 1.214 | 511 |
| 85 | 2.231 | 220 | 5 | 1.173 | 520 |
| 10 | 2.103 | 221 | 5 | 1.152 | 521 |
| 95 | 1.902 | 311 | 10 | 1.115 | 440 |
| 35 | 1.821 | 222 | 15 | 1.006 | 531 |
| 15 | 1.750 | 320 | 10 | 1.051 | 600 |
| 15 | 1.687 | 321 | 5 | 0.997 | 620 |
| 10 | 1.576 | 400 | 5 | 0.962 | 533 |
| 5 | 1.529 | 410 | 5 | 0.883 | 711 |
| 5 | 1.489 | 411 | 5 | 0.875 | 640 |
| 30 | 1.447 | 331 | 10 | 0.842 | 642 |
| 20 | 1.410 | 420 | 10 | 0.821 | 731 |
| 5 | 1.376 | 421 | | | |

*An intensity value of 10 is assigned to the strongest lines of the pattern.

EXAMPLE 13

Cadmium diselenide

A 0.780 g. pellet from a mixture of 1.012 g. of Cd and 1.421 g. of Se was reacted in the manner of Example 9. The product comprised large crystallites at the ends which proved to be CdSe and a narrow region of grayish, micro-crystals in the center. An X-ray powder pattern on this material indicated a mixture of unreacted Se plus a phase that was indexed on the basis of a cubic pyrite-type structure with cell dimension $a=6.615$ A. showing the isotypism of the product and pyrite. This isotypism establishes that the product has the nominal formula $CdSe_2$. After deletion of Se lines, the diffraction pattern was as follows:

| Intensity* | d Spacing | hkl | Intensity* | d Spacing | hkl |
|---|---|---|---|---|---|
| 10 | 3.308 | 200 | 2 | 1.478 | 420 |
| 6 | 2.958 | 210 | 2 | 1.443 | 421 |
| 9 | 2.700 | 211 | 4 | 1.351 | 422 |
| 7 | 2.339 | 220 | 4 | 1.321 | 430 |
| 10 | 1.995 | 311 | 7 | 1.273 | 511 |
| 6 | 1.834 | 320 | 2 | 1.229 | 520 |
| 8 | 1.768 | 321 | 2 | 1.210 | 521 |
| 1 | 1.604 | 410 | 2 | 1.104 | 600 |
| 6 | 1.516 | 331 | | | |

*An intensity value of 10 is assigned to the strongest lines of the pattern.

EXAMPLE 14

Cadmium diselenide

A 0.119 g. pellet from a mixture of 1.012 g. of Cd and 1.421 g. of Se was heated 6 hours at 600° C. and then quenched to room temperature, all at a pressure of 65 kb. Two similar sized samples were also reacted by heating to 800° C. in ½ hr., cooling to 500° C. or 400° C. respectively, in ½ hour, holding at 500° C. or 400° C. for 5 hours, and then quenching to room temperature, all at 65 kb. X-ray diffraction powder data on these three black, crystalline products all showed the same pyrite-type pattern of cadmium diselenide observed in Example 13, plus extra lines corresponding to CdSe and unreacted Se.

EXAMPLE 15

Zinc-cadmium disulfide

A 0.444 g. pellet from a mixture of 0.268 g. of ZnS, 0.397 g. of CdS, and 0.265 g. of S was heated 3 hours at 700° C., slow cooled for 3 hours to 400° C., and then quenched to room temperature, all at a pressure of 65 kb. The product comprised a yellow matrix containing small red and white crystals. An X-ray powder pattern obtained on the product, after deletion of lines corresponding to ZnS, CdS, and a high pressure form of sulfur, was indexed on the basis of two cubic pyrite-type structures with cell dimensions $a_1=6.110$ A. and $a_2=6.056$ A. Using the cell dimensions of the end members as $ZnS_2$, $a=5.954$ A., and $CdS_2$, $a=6.309$ A., application of Vegard's rule [L. Vegard, Z. Phys., 5, 17 (1921); Z. Krist., 67, 239 (1928)—see also "Concise Chemical and Technical Dictionary," H. Bennett, Chemical Publishing Co., 1962, i.e., "when two similar crystalline materials form a solid solution, the lattice constant of this solution divides the space between their respective lattice constants in ratio to their relative quantities"] shows the compositions of these two phases to be $Zn_{0.56}Cd_{0.44}S_2$ and $Zn_{0.71}Cd_{0.29}S_2$.

The electrical resistance of sections of this matrix was observed to be greater than $10^6$ ohms.

EXAMPLE 16

Zinc-cadmium disulfide

A 0.396 g. pellet from a mixture of 0.75 g. of essentially amorphous zinc sulfide (Example 6), 1.00 g. of essentially amorphous cadmium sulfide (Example 12), and 0.40 g. of sulfur was heated 3 hours at 600° C., slow cooled for 3 hours to 300° C., and quenched to room temperature, all at a pressure of 65 kb. The resultant product was yellow-orange in color. An X-ray powder pattern obtained thereon and listed below, after deletion of lines corresponding to ZnS, CdS, and a high pressure form of sulfur, was indexed on the basis of a cubic pyrite-type structure with cell dimension $a=6.125$ A. Using the cell dimensions of the end members as $ZnS_2$, $a=5.954$ A., and $CdS_2$, $a=6.309$, application of Vegard's rule establishes that the product has the composition $Zn_{0.5}Cd_{0.5}S_2$.

| Intensity* | d Spacing | hkl | Intensity* | d Spacing | hkl |
|---|---|---|---|---|---|
| 90 | 3.547 | 111 | 10 | 1.698 | 320 |
| 100 | 3.072 | 200 | 15 | 1.406 | 331 |
| 40 | 2.740 | 210 | 10 | 1.371 | 420 |
| 40 | 2.500 | 211 | 10 | 1.247 | 422 |
| 70 | 2.167 | 220 | 10 | 1.178 | 511 |
| 60 | 1.848 | 311 | 10 | 1.081 | 440 |
| 20 | 1.767 | 222 | | | |

*An intensity value of 100 is assigned to the strongest line of the pattern.

A comparable run carried out for 5 hours at 500° C., followed by a quench to room temperature, gave a similar product. The X-ray powder pattern, after deletion of lines corresponding to ZnS, CdS, and a high pressure form of sulfur, was indexed on the basis of a cubic pyrite-type structure with cell dimension $a=6.059$ A. Application of Vegard's rule gives the approximate composition $Zn_{0.7}Cd_{0.3}S_2$.

EXAMPLE 17
Zinc-cadmium diselenide 0.714 g. pellet from a mixture of 0.327 g. of Zn, 0.562 g. of Cd, and 1.579 g. of Se was heated 4 hours at 600° C., slow cooled to 400° C. in 2 hours, and quenched to room temperature, all at a pressure of 65 kb. The major product was a gray-black solid. An X-ray powder pattern obtained thereon and listed below, after deletion of lines corresponding to ZnSe, CdSe, and unreacted Se, was indexed on the basis of a cubic pyrite-type structure with cell dimension $a=6.464$ A. Using the cell dimensions of the end members as $ZnSe_2$, $a=6.290$ A., and $CdSe_2$, $a=6.615$ A., application of Vegard's rule shows the approximate composition of this phase to be $Zn_{0.46}Cd_{0.54}Se_2$.

| Intensity* | d Spacing | hkl | Intensity* | d Spacing | hkl |
|---|---|---|---|---|---|
| 85 | 3.235 | 200 | 5 | 1.483 | 331 |
| 100 | 2.889 | 210 | 1 | 1.444 | 420 |
| 95 | 2.638 | 211 | 2 | 1.410 | 421 |
| 60 | 2.284 | 220 | 2 | 1.380 | 332 |
| 95 | 1.949 | 311 | 20 | 1.244 | 511 |
| 5 | 1.865 | 222 | 5 | 1.200 | 520 |
| 40 | 1.793 | 320 | 2 | 1.179 | 521 |
| 40 | 1.726 | 321 | 2 | 1.142 | 440 |
| 5 | 1.567 | 410 | 1 | 1.078 | 600 |

*An intensity value of 100 is assigned to the strongest line of the pattern.

The electrical resistance of sections of this product was observed to be greater than $10^6$ ohms.

A pelleted 0.711 g. sample from the same starting mixture above was heated 1 hour at 800° C., slow cooled in 4 hours to 400° C., held 1 hour at this temperature, and then quenched to room temperature, all at a pressure of 65 kb. A product similar to the above resulted and an X-ray powder pattern obtained thereon, after deletion of weak lines corresponding to ZnSe, CdSe, and unreacted Se, was shown to be that of a cubic pyrite-type structure with cell dimension $a=6.510$ A. Application of Vegard's rule gives the approximate composition $$Zn_{0.32}Cd_{0.68}Se_2.$$

EXAMPLE 18
Zinc sulfide-selenide

A 0.426 g. pellet from a mixture of 0.583 g. of essentially amorphous zinc sulfide (Example 6) and 0.355 g. of Se was heated 2 hours at 600° C., slow cooled in 6 hours to 300° C., and quenched to room temperature, all at a pressure of 65 kb. The major product was a mixture of black, yellow, and reddish microcrystals. An X-ray powder pattern obtained on the mixture, after deletion of lines corresponding to ZnS and Se, was indexed on the basis of a cubic pyrite-type structure with cell dimension $a=5.98$ A.

From the cell dimensions of the end members, $ZnS_2$, $a=5.954$ A., and $ZnSe_2$, $a=6.290$ A., application of Vegard's rule gives the approximate composition $$ZnS_{1.84}Se_{0.16}.$$

In a second run employing the same proportions of starting materials, the mixture was heated to 800° C. in 1 hour, cooled to 500° C. in about 10 minutes, held at 500° C. for 3 hours, slow cooled 4 hours to 300° C., and finally quenched to room temperature, all at a pressure of 65 kb. The product was a mixture of yellow, black, and white microcrystals. An X-ray powder pattern obtained on the mixture, was similar to that above and contained lines that were indexed on the basis of a cubic pyrite-type structure with cell dimension $a=5.969$ A. Application of Vegard's rule gives the approximate composition $ZnS_{1.92}Se_{0.08}$.

The compounds of this invention are useful as semiconductors and photoconductors. For example, zinc diselenide is a semiconductor having a resistivity at room temperature of $2 \times 10^6$ ohm-cm. and a resistivity at 170° K. of $1.5 \times 10^9$ ohm-cm. The activation energy of resistivity is 0.24 ev. Photoconductivity was observed in this material. At room temperature its resistivity dropped to about one-tenth of its dark value, i.e., from $2 \times 10^6$ to $2.7 \times 10^5$ ohm-cm., on exposure to visible plus infrared radiation and to $9.4 \times 10^5$ ohm-cm. on exposure to infrared (0.75 to 4.5μ) radiation alone.

Zinc disulfide shows similar properties. The resistivity of a zinc disulfide compact at a pressure of 40 tons/sq. in. at room temperature was $10^6$ ohm-cm. and this value increased with decreasing temperature, indicating the material to be a semiconductor. Photoconductivity of a compact at atmospheric pressure had a dark resistance and a resistance under infrared irradiation (0.75–4.5μ) of $1.3 \times 10^{11}$ ohms. Upon irradiation with U.V. plus visible light (~3000–6000 A.) this resistance dropped to $4.6 \times 10^{10}$ ohms.

These materials, having energy gaps less than about 3 ev., are useful as electronic components, such as rectifying diodes, and as transistors or other active elements for use as electronic circuit elements for rectification, amplification and other functions. As photoconductors, these materials are useful in photocells.

The foregoing detailed description has been given for clarity of understanding only an no unnecessary limitations are to be understood therefrom. The invention is not limited to the exact details shown and described for obvious modifications will be apparent to those skilled in the art.

The embodiments of the invention in which an exclusive property or privilege is claimed are defined as follows.

1. Zinc and cadmium dichalcogenides of the formula $$Zn_{1-x}Cd_xS_ySe_z$$

wherein $x$ is a number in the range of 0 to 1 and $y$ and $z$ are each a number in the range 0 to 2.1, and the sum of $y$ and $z$ is a number in the range of 1.9 to 2.1, said dichalcogenides having the pyrite-type crystal structure.

2. The chalcogenide of claim 1 of the formula $$ZnS_{2.0 \pm 0.1}$$

3. The chalcogenide of claim 1 of the formula $$ZnSe_{2.0 \pm 0.1}$$

4. The chalcogenide of claim 1 of the formula $$CdS_{2.0 \pm 0.1}$$

5. The chalcogenide of claim 1 of the formula $$CdSe_{2.0 \pm 0.1}$$

6. A chalcogenide of claim 1 of the formula $$Zn_{1-x}Cd_xS_{2.0 \pm 0.1}$$

wherein $x$ is a number in the range of 0 to 1.

7. A chalcogenide of claim 1 of the formula $$Zn_{1-x}Cd_xS_{2.0 \pm 0.1}$$

wherein $x$ is a number in the range of 0 to 1.

8. A chalcogenide of claim 1 of the formula $$ZnS_ySe_z$$

wherein $y$ and $z$ each is a number in the range of 0 to 2.1 and the sum of $y$ and $z$ is a number in the range of 1.9 to 2.1.

References Cited

UNITED STATES PATENTS 3,375,071  3/1968  Young ............ 23—204

OTHER REFERENCES

Grillot: Académie des Sciences, Comptes rendus, 230, pp. 1159–1161 (1950).

OSCAR R. VERTIZ, Primary Examiner

HOKE S. MILLER, Assistant Examiner

U.S. Cl. X.R.

23—135, 206

PO-1050
(5/69)

UNITED STATES PATENT OFFICE
CERTIFICATE OF CORRECTION

Patent No. 3,497,331      Dated February 24, 1970

Inventor(s) Tom A. Bither, Jr.

It is certified that error appears in the above-identified patent and that said Letters Patent are hereby corrected as shown below:

Column 1, line 46, "ZN,Cd)Se$_2$" should be -- (Zn,Cd)Se$_2$ line 57, quotation mark is missing before "Zeitschrift";

Column 3,
line 46, "thermocoupled" should be -- thermocouple --;
line 59, "dyne/scm.$^2$" should be -- dynes/cm.$^2$ --;

Column 7, line 49, "1.006" should be -- 1.066 --;
line 56, "10" should be -- 100 --;

Column 10, line 74, Claim 7, "Zn$_{1-x}$Cd$_x$S$_{2.0 \pm 0.1}$" should be -- Zn$_{1-x}$Cd$_x$Se$_{2.0 \pm 0.1}$ --.

SIGNED AND
SEALED
AUG 11 1970

(SEAL)
Attest:

Edward M. Fletcher, Jr.
Attesting Officer

WILLIAM E. SCHUYLER, JR.
Commissioner of Patents